July 5, 1938.  R. L. BOURKE  2,122,676
TRANSMISSION FOR PISTON AND CRANKSHAFT ASSEMBLIES
Filed May 12, 1936   3 Sheets-Sheet 1

INVENTOR,
Russell L. Bourke
BY
J. E. Trabucco
ATTORNEY.

July 5, 1938.   R. L. BOURKE   2,122,676
TRANSMISSION FOR PISTON AND CRANKSHAFT ASSEMBLIES
Filed May 12, 1936   3 Sheets-Sheet 2

INVENTOR,
Russell L Bourke
BY
J. E. Trabucco
ATTORNEY.

July 5, 1938.  R. L. BOURKE  2,122,676
TRANSMISSION FOR PISTON AND CRANKSHAFT ASSEMBLIES
Filed May 12, 1936  3 Sheets-Sheet 3

INVENTOR,
Russell L. Bourke
BY J. E. Trabucco
ATTORNEY.

Patented July 5, 1938

2,122,676

UNITED STATES PATENT OFFICE 2,122,676

TRANSMISSION FOR PISTON AND CRANK-SHAFT ASSEMBLIES

Russell L. Bourke, Petaluma, Calif.

Application May 12, 1936, Serial No. 79,286

4 Claims. (Cl. 74—50)

This invention relates to improvements in internal combustion engines and particularly to transmissions for crank shafts and pistons.

An object of my invention is to provide an improved engine having novel transmission means operatively connecting the pistons with the crank shaft.

Other and further objects of my invention will be pointed out hereinafter, indicated in the appended claims, or obvious to one skilled in the art upon an understanding of the present disclosure.

For the purposes of this application, I have elected to show herein certain forms and details of transmissions for crank shafts and pistons for internal combustion engines which are representative of my invention; the constructions herein shown and described, while capable of use with engines of various kinds, are particularly well adapted for use with internal combustion engines of the type disclosed in my co-pending application for Letters Patent, Serial No. 726,321, filed May 18, 1934; it is understood, however, that the particular construction herein illustrated is not to be regarded as exhaustive of the variations of my invention nor is it to be given any interpretation such as might have the effect of limiting the claims, short of the true and most comprehensive scope of the invention in the art.

Figure 1:
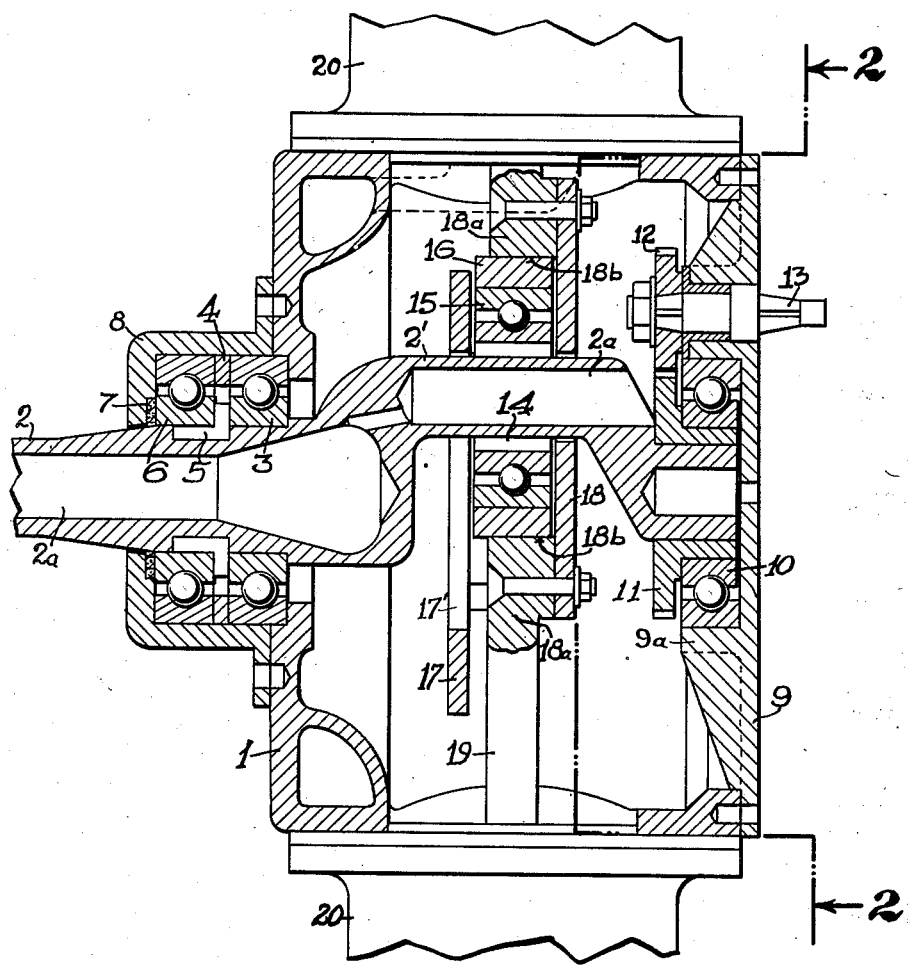
Figure 1 is a vertical sectional view taken on the line 1—1 of Figure 2, showing a crank shaft and bearing assembly embodying my invention.
Figure 2:
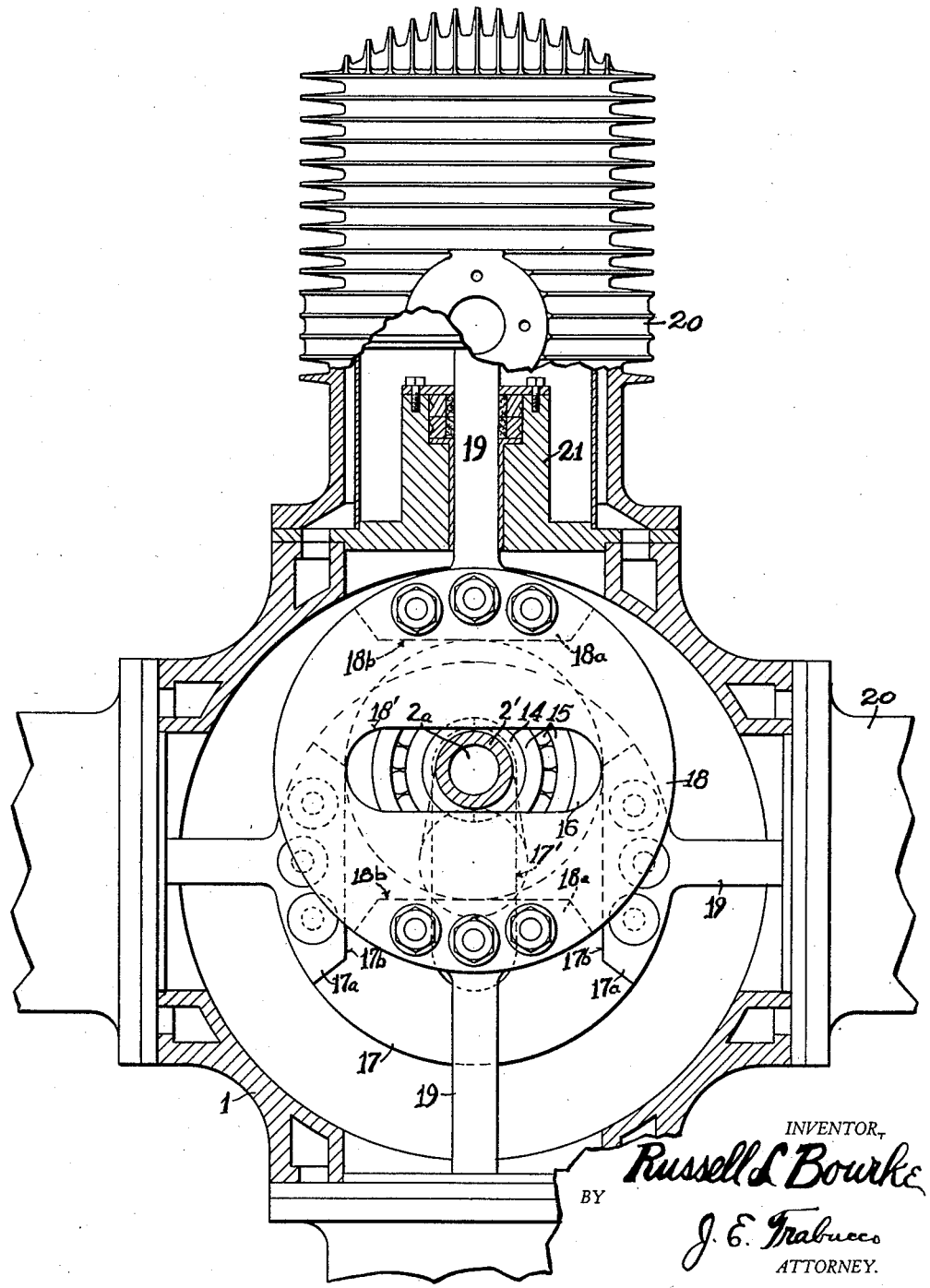
Figure 2 is a sectional view taken on the line 2—2 of Figure 1.

Referring to the drawings, the numeral 1 designates a crank case having centrally disposed bearings at its front and rear sides within which a crank shaft 2 is rotatably mounted. The crank case is provided with suitable inlet means for the insertion of lubricating oil, the normal level of which is slightly beneath the central axis of the said case, and with packing glands of the customary kind, which serve to prevent the escape of oil through the crank shaft bearings. The bearing at the front of the crank case through which the shaft 2 extends is particularly designed to eliminate any whip action on the end of said shaft and to take up the thrust ordinarily accompanying the fast rotation of said shaft in either direction. The shaft 2 is encircled by a thrust bearing 3 which is partly imbedded in an annular groove in the front side of the casing. Also, encircling the shaft 2 and spaced from the bearing 3 by a washer 4 and a flanged split bushing 5 which is partly imbedded in an annular groove in said shaft, is a similar bearing 6. A fiber or felt pad 7 encircling the shaft 2 is held against the front side of the bearing 6 by a front or nose plate 8 which is bolted to the crank case 1 and is so shaped and positioned that it encases the bearings 3 and 6 and maintains them in proper operating positions. The bearing 6 being in engagement with the split bushing 5 secured in a fixed position on the shaft 2, the said bushing being in contact with the thrust bearing 3, and the latter being in engagement with the front side of the casing 1, affords a novel and improved construction for taking up the thrust action of the shaft, thereby preventing the usual damaging effect to the shaft's crank arm or throw when the engine is operating at high speeds.

The rear end of the crank case is enclosed by a rear cover plate 9 having an inwardly disposed annular flange 9a within which a bearing 10 is mounted. The bearing 10 is mounted on the hub of a circular gear 11 to which is keyed the rear end of the shaft 2. A circular gear 12 having a rearwardly projecting rod 13 secured thereto for use in starting the engine, is in mesh with the gear 11.

The crank shaft 2 is formed with a suitable crank arm or offset 2', which is adapted to dip into the oil in the crank case during its rotation, the said crank arm having a suitable split bushing 14 extending therearound. Mounted on the bushing 14 is a bearing member 15 having an encircling ring 16 secured thereto. The bearing member 15 is mounted between two cooperating bearing plates 17 and 18, each of which is formed in the shape of a circular disc. The bearing plates 17 and 18 are provided respectively with elongated slots 17' and 18' through which the crank arm 2' of the crank shaft rotatably and movably extends, the said slots being disposed at right angles to one another. Suitably secured as by bolts to the opposing faces of bearing plates 17 and 18 respectively, are blocks 17a and 18a which respectively provide opposing shoulders 17b and 18b over which the ring-shaped member 16 of the bearing 15 moves back and forth. The slots 17' and 18' are parallel to the shoulders 17b and 18b respectively, thereby permitting the crank arm 2' and the bearing member 15 with its outer ring 16 to move simultaneously back and forth. Formed integrally with, or otherwise suitably secured to the blocks 17a and 18a are a number of connecting rods 19 which extend into oppositely disposed cylinders 20 bolted to the crank case 1. The connecting rods 20 each slidably extends through a guide member 21 and is secured at its outwardly disposed end to a piston which is mounted for reciprocating motion in a cylinder 20.

The crank shaft 2 and its crank arm 2' are provided with a continuous bore or breather channel 2a which is open to the atmosphere at a point outside the crank case and which provides means for permitting air or gases to proceed to and from the crank case 1 when the temperature of the engine changes. The inwardly disposed end of the channel 2a terminates at the rear end of the horizontal part of the crank arm 2' and at a point not in alignment with that part of the channel located in the shaft proper, thereby preventing the escape of the oil from the interior of the crank case, irrespective of what position the engine might assume.

As illustrated on the drawings, each of the bearings 3, 6, 10 and 15 is preferably made up of inner and outer circular spaced races between which are a number of steel balls.

Figure 3:
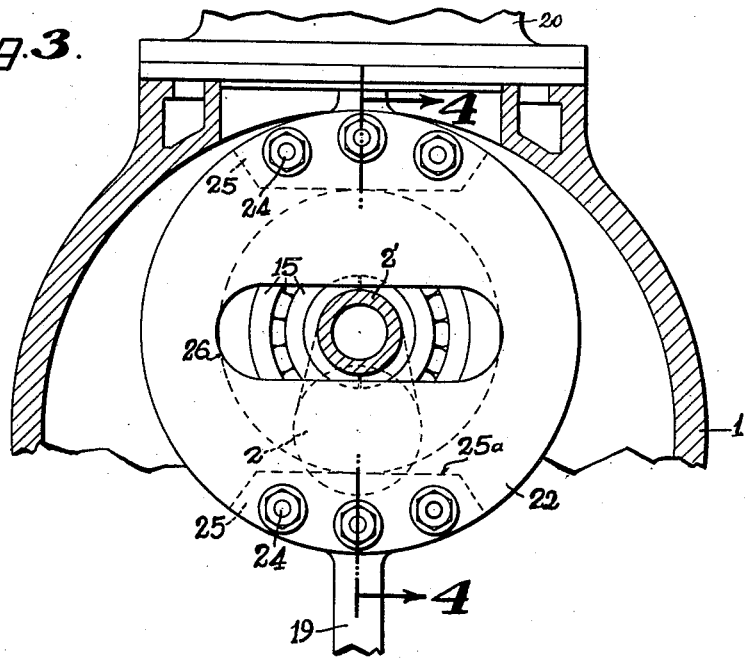
Figure 3 is a vertical sectional view of a part of a crank case, showing a modified transmission assembly of the kind employed with a two cylinder engine.
Figure 4:
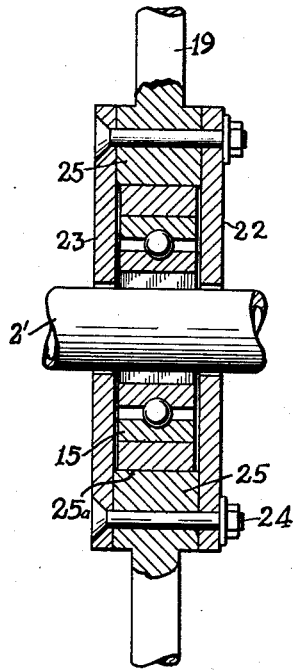
Figure 4 is a sectional view taken on the line 4—4 of Figure 3.

In the modified form illustrated in Figs. 3 and 4, wherein my improved transmission means is used in an engine having but two opposed cylinders and pistons, I have shown two spaced bearing plates 22 and 23 secured together by bolts 24. Interposed between the bearing plates, and suitably secured thereto as by bolts 24, are oppositely disposed blocks 25 which are formed integrally with or otherwise suitably secured to connecting rods 19 that extend into oppositely disposed cylinders 20 attached to the crank case 1. The bearing plates 22 and 23 are provided with centrally disposed elongated and aligned slots 26 which are positioned in a plane parallel to opposed parallel surfaces 25a provided on the blocks 25. Movably extending through the slots 26 is the crank arm 2' of a crank shaft 2, which has a split bushing 14 mounted thereon. Mounted on the bushing 14 is a bearing member 15 having an encircling ring secured thereto. The bearing member 15 is mounted between the spaced bearing plates 22 and 23 with its periphery movably engaging with the opposed parallel surfaces 25a of the block 25. The parallel arrangement of the slots 26 of the cam plates with the surfaces 25a of the blocks 25 permits the crank arm 2' and the bearing member 15 to move back and forth in unison. The two connecting rods 19 are each suitably secured at their outwardly disposed ends to a piston mounted for reciprocating motion in a cylinder 20.

Having described my invention, what I claim is:

1. In an engine having a plurality of opposed pistons and a crank shaft, transmission means for converting the reciprocating motion of the pistons into rotary motion of the crank shaft comprising a bearing member encircling the crank shaft, a pair of spaced bearing plates positioned on opposite sides of the bearing member, each having a centrally disposed elongated slot through which the crank shaft movably extends, the slots being positioned in planes positioned at right angles to each other, a pair of spaced blocks secured to the inner face of each bearing plate, each pair of said blocks having opposed surfaces lying in parallel planes, the said parallel surfaces of each pair of blocks being positioned in planes parallel to the longitudinal axis of the slot in the particular bearing plate to which its said blocks are secured, the said surfaces of the blocks being in engagement with the periphery of the bearing member, and connecting rods converging substantially toward a common center connecting the pistons to the blocks.

2. In an engine, transmission means connecting a plurality of opposed pairs of pistons to a crank shaft, comprising a single circular bearing member secured on the crank shaft, a pair of slotted and spaced plates positioned at opposite sides of the bearing member through which the crank shaft movably extends, and a connecting rod secured to each piston having a block secured to its inwardly disposed end, the two blocks associated with each pair of opposed pistons being secured to the inner face of one of the plates near opposite ends thereof, the said blocks having inwardly disposed surfaces with which the periphery of the bearing member engages.

3. In an engine, transmission means connecting a pair of opposed pistons to a crank shaft, comprising a pair of spaced bearing plates having centrally disposed elongated and parallel slots through which the crank shaft movably extends, a pair of spaced blocks secured to and positioned between the bearing plates at opposite sides of the slots, the said blocks having opposed surfaces lying in parallel planes which are also parallel to the longitudinal axes of the slots in the bearing plates, connecting rods connecting the blocks and the pistons, a split bushing extending around the shaft, and a bearing member encircling the bushing and positioned between the bearing plates with its periphery in engagement with the opposed surfaces of the blocks.

4. In an engine, transmission means connecting a pair of opposed pistons to a crank shaft, comprising a circular bearing member mounted on the shaft, a pair of spaced bearing plates positioned at opposite sides of the bearing member having centrally disposed elongated and parallel slots through which the crank shaft movably extends, a pair of spaced blocks secured to and positioned between the bearing plates at opposite sides of their slots, the said blocks having opposed parallel surfaces lying in planes parallel to the central longitudinal axis of the slots, the bearing member being positioned between the blocks with its periphery engaging with their parallel surfaces, and connecting rods connecting the blocks and the pistons.

RUSSELL L. BOURKE.